United States Patent
Zurlo et al.

Patent Number: 5,898,932
Date of Patent: Apr. 27, 1999

[54] PORTABLE CELLULAR PHONE WITH INTEGRAL SOLAR PANEL

[76] Inventors: James C. Zurlo, 323 Yale Ave., Morton, Pa. 19070; Mark L. Schulcz, 1702 5th Ave., Folson, Pa. 19033

[21] Appl. No.: 08/823,337

[22] Filed: Mar. 24, 1997

[51] Int. Cl.⁶ ...................................................... H04B 1/38
[52] U.S. Cl. ............................ 455/573; 455/575; 320/101
[58] Field of Search ..................................... 455/550, 572, 455/573, 574, 575, 90, 351, 343, 127, 66; 320/101, 115, 102; 340/825.44

[56] References Cited

U.S. PATENT DOCUMENTS

| | | | |
|---|---|---|---|
| 4,017,725 | 4/1977 | Roen | 320/101 |
| 4,092,580 | 5/1978 | Prinsze | 320/2 |
| 4,209,735 | 6/1980 | Yoshida | 320/101 |
| 4,731,813 | 3/1988 | Schroeder | 455/573 |
| 4,786,851 | 11/1988 | Fuji et al. | 320/2 |
| 5,012,220 | 4/1991 | Miller | 340/825.44 |
| 5,151,643 | 9/1992 | Emmert et al. | 455/573 |
| 5,189,358 | 2/1993 | Tomura et al. | 455/573 |
| 5,229,701 | 7/1993 | Le'man et al. | 455/90 |
| 5,251,329 | 10/1993 | Takagi et al. | 455/572 |
| 5,333,176 | 7/1994 | Burke et al. | 455/573 |
| 5,479,486 | 12/1995 | Saji | 455/573 |
| 5,587,645 | 12/1996 | Sciammarella et al. | 320/2 |
| 5,764,030 | 6/1998 | Gaza | 320/116 |

OTHER PUBLICATIONS

Web Photovoltaic Power (Copyright 1991, Solar Web, Inc.), 1991.

*Primary Examiner*—Thanh Cong Le

[57] ABSTRACT

A new and improved portable cellular phone with integral solar panel including a portable cellular telephone with a rectangular configuration having a front face, a rear face, and a periphery formed therebetween defining an interior space. The front face has a plurality of operating components including a display, a plurality of keys, a microphone, and a speaker situated thereon for allowing conventional usage of the telephone. A planar rectangular solar panel is coupled to the rear face of the telephone. The solar panel is adapted to convert ambient light into electric power. At least one rechargeable battery is situated within the interior space of the telephone and electrically connected to the operating components of the phone for supplying power thereto. Finally, power connection circuitry is electrically connected between the solar panel and the batteries. The power connection circuitry is adapted to permit the flow of power from the solar panel to the at least one battery and further preclude the flow of power from the at least one battery to the solar panel.

1 Claim, 2 Drawing Sheets

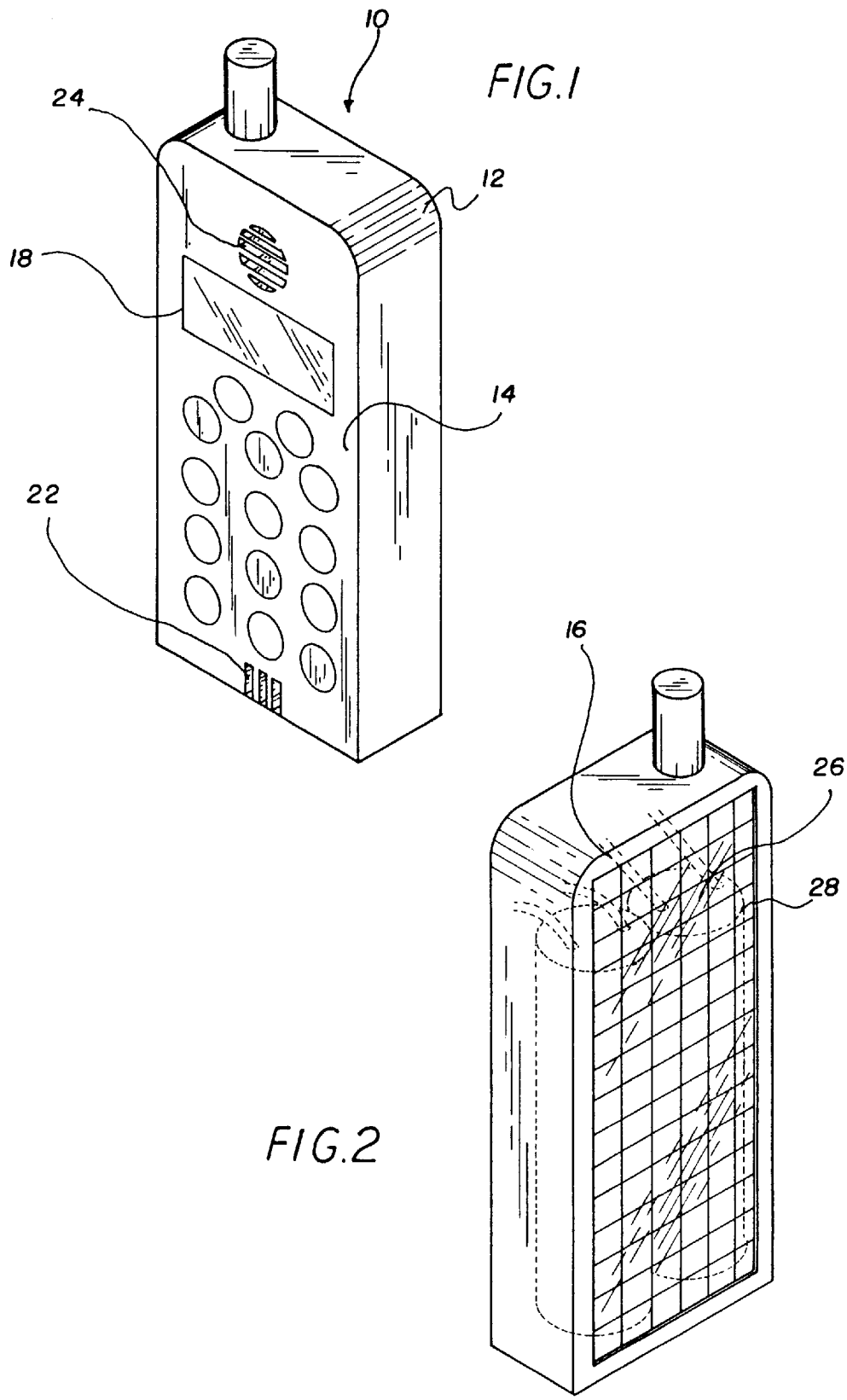

PORTABLE CELLULAR PHONE WITH INTEGRAL SOLAR PANEL

BACKGROUND OF THE INVENTION

1. Field of the Invention

The present invention relates to a portable cellular phone with integral solar panel and more particularly pertains to powering a portable cellular phone via a solar panel attached to a rear face thereof.

2. Description of the Prior Art

The use of cellular phones is known in the prior art. More specifically, cellular phones heretofore devised and utilized for the purpose of affording portable communication are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 4,905,270 to Ono; U.S. Pat. No. 5,377,256 to Franklin et al.; U.S. Pat. No. Des. 355,183 to Ino et al.; U.S. Pat. No. 5,333,176 to Burke et al.; U.S. Pat. No. 4,748,655 to Thrower et al.; and U.S. Pat. No. 4,441,143 to Richardson, Jr.

In this respect, the portable cellular phone with integral solar panel according to the present invention substantially departs from the conventional concepts and designs of the prior art, and in so doing provides an apparatus primarily developed for the purpose of powering a portable cellular phone via a solar panel attached to a rear face thereof.

Therefore, it can be appreciated that there exists a continuing need for a new and improved portable cellular phone with integral solar panel which can be used for powering a portable cellular phone via a solar panel attached to a rear face thereof. In this regard, the present invention substantially fulfills this need.

SUMMARY OF THE INVENTION

In view of the foregoing disadvantages inherent in the known types of cellular phones now present in the prior art, the present invention provides an improved portable cellular phone with integral solar panel. As such, the general purpose of the present invention, which will be described subsequently in greater detail, is to provide a new and improved portable cellular phone with integral solar panel which has all the advantages of the prior art and none of the disadvantages.

To attain this, the present invention essentially comprises a portable cellular telephone with a rectangular configuration. The cellular telephone has a front face, a rear face, and a periphery formed therebetween defining an interior space. As shown in FIG. 1, the front face has a plurality of operating components including a display, a plurality of keys, a microphone, and a speaker situated thereon. Such components are adapted for allowing conventional usage of the telephone. With reference to FIG. 2, it can be seen that a planar rectangular solar panel is included. The solar panel is coupled to the rear face of the telephone. Further, the solar panel has a size equivalent to that of the rear face. In use, the solar panel is adapted to convert ambient light into electric power upon the receipt thereof. Also shown in FIG. 2, a pair of rechargeable batteries are situated within the interior space of the telephone. The batteries are electrically connected to the operating components of the phone for supplying power thereto. Note FIG. 4. The rechargeable batteries are further adapted to recharge upon the receipt of power. Further included is a power connection means electrically connected between the solar panel and the batteries. The power connection means is adapted to permit the flow of power from the solar panel to the at the batteries and further preclude the flow of power from the at least one battery to the solar panel.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved portable cellular phone with integral solar panel which has all the advantages of the prior art cellular phones and none of the disadvantages.

It is another object of the present invention to provide a new and improved portable cellular phone with integral solar panel which may be easily and efficiently manufactured and marketed.

It is a further object of the present invention to provide a new and improved portable cellular phone with integral solar panel which is of a durable and reliable construction.

An even further object of the present invention is to provide a new and improved portable cellular phone with integral solar panel which is susceptible of a low cost of manufacture with regard to both materials and labor, and which accordingly is then susceptible of low prices of sale to the consuming public, thereby making such portable cellular phone with integral solar panel economically available to the buying public.

Still yet another object of the present invention is to provide a new and improved portable cellular phone with integral solar panel which provides in the apparatuses and methods of the prior art some of the advantages thereof, while simultaneously overcoming some of the disadvantages normally associated therewith.

Still another object of the present invention is to power a portable cellular phone via a solar panel attached to a rear face thereof.

Lastly, it is an object of the present invention to provide a new and improved new and improved portable cellular phone with integral solar panel including a portable cellular telephone with a rectangular configuration having a front face, a rear face, and a periphery formed therebetween defining an interior space. The front face has a plurality of operating components including a display, a plurality of keys, a microphone, and a speaker situated thereon for allowing conventional usage of the telephone. A planar rectangular solar panel is coupled to the rear face of the telephone. The solar panel is adapted to convert ambient light into electric power. At least one rechargeable battery is situated within the interior space of the telephone and electrically connected to the operating components of the phone for supplying power thereto. Finally, power connection circuitry is electrically connected between the solar panel and the batteries. The power connection circuitry is adapted to permit the flow of power from the solar panel to the at least one battery and further preclude the flow of power from the at least one battery to the solar panel.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective illustration of the preferred embodiment of the portable cellular phone with integral solar panel constructed in accordance with the principles of the present invention.

FIG. 2 is a rear perspective view of the present invention showing the unique positioning of the solar panel.

Similar reference characters refer to similar parts throughout the several views of the drawings.

DESCRIPTION OF THE PREFERRED EMBODIMENT

Figure 3:
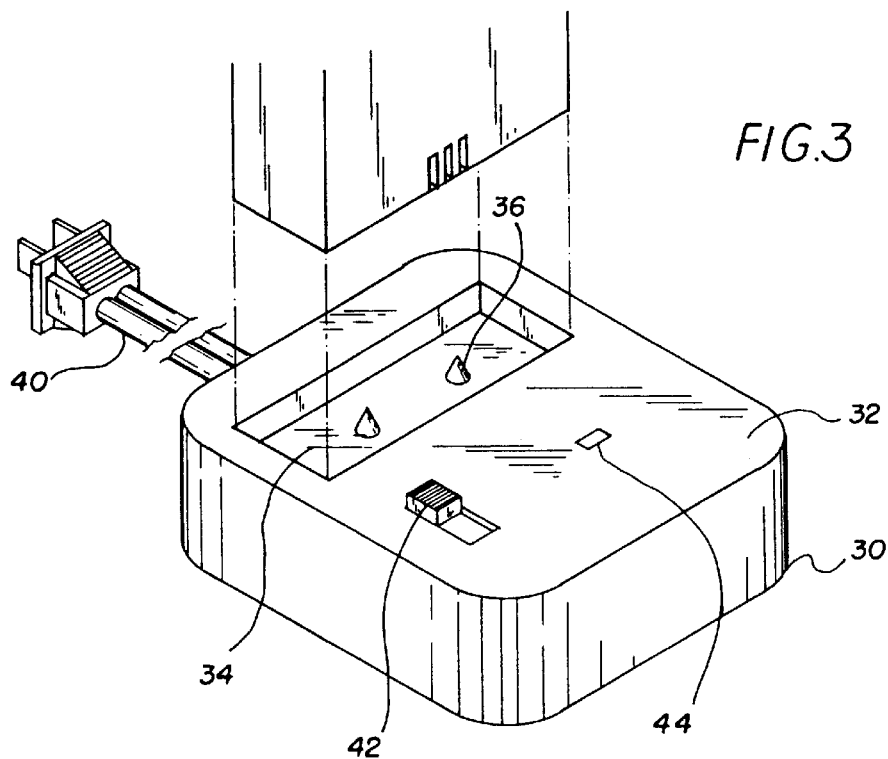
FIG. 3 is a perspective view of the optional alternate charging means of an alternate embodiment of the present invention.

With reference now to the drawings, and in particular to FIG. 1 thereof, a new and improved portable cellular phone with integral solar panel embodying the principles and concepts of the present invention and generally designated by the reference numeral 10 will be described.

The present invention, the new and improved portable Us cellular phone with integral solar panel, is comprised of a plurality of components. Such components in their broadest context include a cellular phone, a solar panel, and a pair of batteries. Such components are individually configured and correlated with respect to each other so as to attain the desired objective.

More specifically, it will be noted that the system 10 of the present invention includes a portable cellular telephone 12 with a rectangular configuration. The cellular telephone has a front face 14, a rear face 16, and a periphery formed therebetween defining an interior space. As shown in FIG. 1, the front face has a plurality of operating components including a display 18, a plurality of keys 20, a microphone 22, and a speaker 24 situated thereon. Such components are adapted for allowing conventional usage of the telephone.

With reference to FIG. 2, it can be seen that a planar rectangular solar panel 26 is included. The solar panel is coupled to the rear face of the telephone. Further,.the solar panel has a size equivalent to that of the rear face, thereby being exposed to a maximum amount of light. Ideally, the rear face of the telephone and the solar panel have an area of at least 15 square inches. In use, the solar panel is adapted to convert ambient light into electric power upon the receipt thereof. By placing the solar panel on the rear face of the telephone, the solar panel is in an ideal position for being exposed to ambient light especially during use of the phone.

Also shown in FIG. 2, a pair of cylindrical rechargeable batteries including a first battery 28 and a second battery 29 are situated within the interior space of the telephone. The batteries are electrically connected to the operating components of the phone for supplying power thereto. Note FIG. 4. The rechargeable batteries are further adapted to recharge upon the receipt of power.

As an option, in an alternate embodiment, an alternate recharging means 30 is included. See FIG. 3. Such alternate recharging means includes a conventional recharging stand which when utilized in combination with the solar panel affords a highly versatile device. The recharging stand includes a rectangular base 32 with a rectangular inset portion 34 formed in a top face thereof. A pair of contacts 36 are formed within the rectangular inset portion. The alternate recharging means is connectable to a conventional electric receptacle via a cord 40 and adapted to supply power to the contacts. To allow the telephone to receive power from the recharging stand, the telephone is equipped with a pair of unillustrated contacts situated on a bottom face thereof and electrically connected to the batteries. As such, upon heavy use of the telephone or use in the absence of ambient light, a user may utilize the recharging stand to recharge the batteries. To facilitate the operation of the charging stand, a switch 42 is included for allowing selective supply of power to the contacts. Further, a charging light 44 is situated on the top face of the base for indicating that the power is being supplied.

Figure 4:
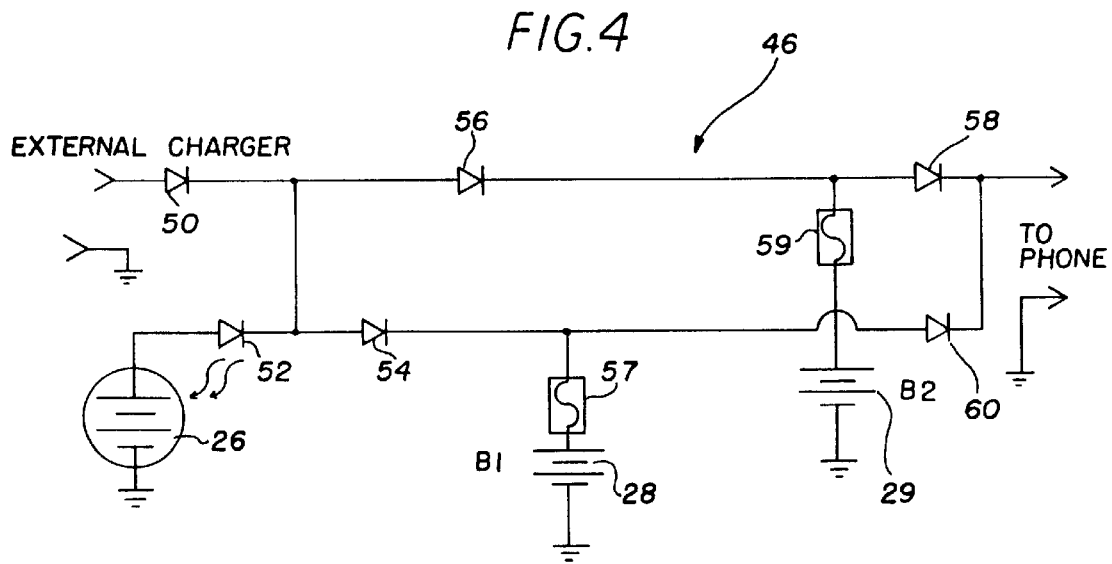
FIG. 4 is a schematic diagram of the circuitry employed in the preset invention.

Further included is a power connection means 46 electrically connected between the telephone, solar panel, recharging stand, and the batteries. The power connection means is adapted to permit the flow of power from the solar panel to the batteries and further preclude the flow of power between the batteries and further to the solar panel. In addition, the power connection means is adapted to permit the flow of power only from the recharging stand to the batteries and further permits the flow of power only from the batteries to the telephone. To accomplish such, the present invention includes a unique array of diodes connected between the forgoing components. As shown in FIG. 4, an anode of a first diode 50 is connected to an output of the charging stand and an anode of a second diode 52 is connected to an output of the solar panel, wherein a cathode of the first and second diodes are connected. By this structure, the first and second diodes prevent power from entering the solar panel or recharging stand. Further, the cathodes of the first and second diodes are connected to anodes of both a third diode 54 and fourth diode 56. A cathode of the third diode is connected to the first battery with a first fuse 57 situated therebetween. A cathode of the fourth diode is connected to the second battery with a second fuse 59 situated therebetween. A fifth diode 58 is connected at an anode thereof to the cathode of the fourth diode. Similarly, a sixth diode 60 is connected at an anode thereof to the cathode of the third diode. The fifth diode and the sixth diode are connected together at the cathodes thereof. The cathodes of the fifth and sixth diodes are further connected to the operating components of the phone. It should be understood that the third, fourth, fifth, and sixth diodes preclude the flow of power between the batteries.

By the redundant inclusion of a second battery, the operation of the phone remains operable in case one of the batteries fails. Further, with the specific interconnection between the batteries, recharging stand, solar panel, diodes and fuses, each battery is isolated and is further protected from effecting a dangerous situated if the voltage should escalate. Lastly, isolation of the various components prevents one of the batteries from charging the other and also prevents damaging of the various components of the preset invention.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved portable cellular phone with integral solar panel comprising, in combination:

a portable cellular telephone with a rectangular configuration having a front face, a rear face, and a periphery formed therebetween defining an interior space, the front face having a plurality of operating components including a display, a plurality of keys, a microphone, and a speaker situated thereon for allowing conventional usage of the telephone;

a planar rectangular solar panel coupled to the rear face of the telephone, the solar panel having a size equivalent to that of the rear, the solar panel adapted to convert ambient light into electric power, wherein the solar panel has an area of at least 15 square inches;

a pair of rechargeable batteries situated within the interior space of the telephone and electrically connected to the operating components of the phone for supplying power thereto, the rechargeable batteries further adapted to recharge upon the receipt of power;

a conventional recharging stand including a rectangular base with a rectangular inset portion formed in a top face thereof and a pair of contacts formed within the rectangular inset portion and connectable to a conventional electric receptacle via a cord, wherein the telephone is equipped with a pair of auxiliary contacts situated on a bottom face thereof and electrically connected to the batteries to allow the same to receive power from the recharging stand, the recharging stand having a switch for allowing the selective supply of power to the contacts and a charging light situated on the top face of the base for indicating that the power is being supplied; and power connection means electrically connected between the telephone, solar panel, recharging stand, and the batteries, the power connection means adapted to permit the flow of power from the solar panel to the batteries and further preclude the flow of power between the batteries and further to the solar panel, the power connection means also adapted to permit the flow of power from the recharging stand only to the batteries and the telephone and further permit the flow of power from the batteries only to the telephone, wherein the power connection means includes an array of diodes.

* * * * *